(12) United States Patent
Jaygarl et al.

(10) Patent No.: US 11,264,031 B2
(45) Date of Patent: Mar. 1, 2022

(54) METHOD FOR PROCESSING PLANS HAVING MULTIPLE END POINTS AND ELECTRONIC DEVICE APPLYING THE SAME METHOD

(71) Applicant: Samsung Electronics Co., Ltd., Suwon-si (KR)

(72) Inventors: Hojun Jaygarl, Suwon-si (KR); Jinwoong Kim, Suwon-si (KR); Kwangbin Lee, Suwon-si (KR); Donghee Suh, Suwon-si (KR); Sungyul Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 16/783,364

(22) Filed: Feb. 6, 2020

(65) Prior Publication Data

US 2020/0286477 A1  Sep. 10, 2020

(30) Foreign Application Priority Data

Mar. 6, 2019  (KR) .................. 10-2019-0025544

(51) Int. Cl.
*G10L 15/22* (2006.01)
*G10L 15/30* (2013.01)
*G10L 15/18* (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
USPC ..................................... 704/1–504
See application file for complete search history.

(56) References Cited

U.S. PATENT DOCUMENTS

| 6,199,034 | B1 * | 3/2001 | Wical ...................... G06F 40/30 704/9 |
| 9,576,574 | B2 * | 2/2017 | van Os .................... G06F 3/167 |
| 10,058,290 | B1 * | 8/2018 | Proud ...................... G16H 40/67 |
| 10,354,014 | B2 | 7/2019 | Sharma et al. |
| 2014/0074483 | A1 * | 3/2014 | van Os .................... G06F 3/167 704/275 |
| 2014/0172953 | A1 | 6/2014 | Blanksteen |
| 2015/0112962 | A1 | 4/2015 | Simhon et al. |

(Continued)

FOREIGN PATENT DOCUMENTS

EP  3 316 121 A1  5/2018

OTHER PUBLICATIONS

International Search Report dated May 8, 2020, issued in International Patent Application PCT/KR2020/000990.

*Primary Examiner* — Marcus T Riley
(74) *Attorney, Agent, or Firm* — Jefferson IP Law, LLP

(57) ABSTRACT

A method for processing plan is provided. The method includes multiple end points including obtaining an intent corresponding to a user utterance, generating the plan for setting a connection order of actions for executing the intent, determining whether there are multiple end points of the actions, determining whether the actions having different end points are independent, and combining actions having the same end points to generate a plurality of sub plans again and then processing the plurality of sub plans in parallel when the actions having the different end points are independent.

20 Claims, 13 Drawing Sheets

(56) References Cited

U.S. PATENT DOCUMENTS

| | | |
|---|---|---|
| 2015/0201250 A1 | 7/2015 | Yaroshenko |
| 2015/0213355 A1 | 7/2015 | Sharma et al. |
| 2015/0279366 A1* | 10/2015 | Krestnikov ............. G10L 15/22 704/235 |
| 2016/0042748 A1 | 2/2016 | Jain et al. |
| 2016/0351196 A1 | 12/2016 | Fanty |
| 2017/0024378 A1 | 1/2017 | Sharma et al. |
| 2018/0133900 A1* | 5/2018 | Breazeal ................ B25J 19/026 |
| 2018/0167516 A1 | 6/2018 | Warrick |
| 2018/0247645 A1 | 8/2018 | Li et al. |
| 2018/0253202 A1* | 9/2018 | Kong .................... G06F 3/0488 |
| 2018/0329998 A1* | 11/2018 | Thomson ................ G10L 15/22 |
| 2019/0013024 A1* | 1/2019 | Jeon ........................ G10L 15/26 |
| 2019/0066674 A1* | 2/2019 | Jaygarl ................... G06F 3/167 |
| 2019/0245978 A1 | 8/2019 | Warrick |
| 2020/0286477 A1* | 9/2020 | Jaygarl ............... G10L 15/1822 |

\* cited by examiner

METHOD FOR PROCESSING PLANS HAVING MULTIPLE END POINTS AND ELECTRONIC DEVICE APPLYING THE SAME METHOD

CROSS-REFERENCE TO RELATED APPLICATION(S)

This application is based on and claims priority under 35 U.S.C. § 119(a) of a Korean patent application number 10-2019-0025544, filed on Mar. 6, 2019, in the Korean Intellectual Property Office, the disclosure of which is incorporated by reference herein in its entirety.

BACKGROUND

1. Field

The disclosure relates to a method for processing plans having multiple end points and an electronic device applying the same method.

2. Description of Related Art

An electronic device may receive a voice from a user through a speech recognition service or a speech recognition interface to provide various content services based on the user intent or to perform various functions included in the electronic device. For the purpose of operating in response to the entered voice, the electronic device recognizes a voice such as the user's utterance and transmits the recognized voice to an intelligence server. For example, the intelligence server may grasp the intent by analyzing the content of the recognized voice and then may establish a plan for performing operations corresponding to the intent. For example, the plan may include location information and operation contents for performing or storing the intent. Furthermore, in the plan, the above information may be delivered to a device to be executed using deep link.

The plan may include information of a capsule for performing operations corresponding to the intent. Moreover, the plan may set the connection order of concepts and/or actions in the capsule and may specify the execution order of the concepts and/or actions stored in the capsule. The concept and/or action stored in the capsule may be performed depending on the plan, and the concept and/or action stored in the next capsule may be performed based at least partly on the result of the previous action.

The plan may include the deep link. The deep link may be in the form of a uniform resource locator (URL) including a location and a command for performing an operation corresponding to the intent. The command may be stored in the memory of the electronic device or may be stored in the intelligence server. When the command stored in the memory is executed, the intent may be extracted from a voice server and may be transmitted to the electronic device; the electronic device may perform actions necessary to perform the intent. When the command in the intelligence server is extracted, the intent may be extracted from the voice server and then may be transmitted to the intelligence server; the intelligence server may perform actions and then may deliver the result of performing the action.

The above information is presented as background information only to assist with an understanding of the disclosure. No determination has been made, and no assertion is made, as to whether any of the above might be applicable as prior art with regard to the disclosure.

SUMMARY

The final execution location of concepts and actions performed by the capsules according to a plan or the storage location of the commands may be set depending on the end point of the action. When any action is executed by an electronic device using the information stored in the electronic device, the end point of the corresponding action may be an electronic device, when another action is executed by an intelligence server using the information stored in the intelligence server, the end point of the corresponding action may be an intelligence server. When both the information stored inside the electronic device and the information stored inside the intelligence server are used and a plan in which the corresponding actions are executed in each of the electronic device and intelligence server is established, the corresponding plan may have multiple end points.

In the case where the action stored in the capsule is executed in the order set in the plan and then the action stored in the next capsule is executed when a plan having multiple end points is processed, a state where only one of the electronic device or the intelligence server performs an action and the other thereof waits without performing an action may occur continuously, and thus the latency may occur.

Also, when the command having different end points is processed, frequent interactions between electronic devices and intelligence servers may lead to the latency.

Aspects of the disclosure are to address at least the above-mentioned problems and/or disadvantages and to provide at least the advantages described below. Accordingly, an aspect of the disclosure is to provide a method of processing actions for which an order is set to be performed in a plan having multiple end points and/or actions executed by the command having different end points for each end point and reducing latency.

Additional aspects will be set forth in part in the description which follows and, in part, will be apparent from the description, or may be learned by practice of the presented embodiments.

In accordance with an aspect of the disclosure, a method for processing plan is provided. The method includes multiple end points may include obtaining an intent corresponding to a user utterance, generating the plan for setting a connection order of actions for executing the intent, determining whether there are multiple end points of the actions, determining whether the actions having different end points are independent, and combining actions having the same end points to generate a plurality of sub plans again and then processing the plurality of sub plans in parallel when the actions having the different end points are independent.

In accordance with another aspect of the disclosure, an electronic device applying a method for processing plans including multiple end points is provided. The electronic device includes a client module operationally connected to an intelligence server and an execution engine operatively connected to the client module. The client module may be configured to receive a user utterance to transmit the user utterance to the intelligence server, to set a connection order of concepts and/or actions, using the plans, to receive a first sub plan generated using first actions having the electronic device as an end point among the actions from the intelligence server, to generate a second sub plan, using second actions having the intelligence server as the end point among the actions, and to process the first sub plan and the second sub plan in parallel when the actions having the different end points are independent.

In accordance with another aspect of the disclosure, a method of processing plans including multiple end points is provided. The method includes determining whether there are a plurality of end points of actions, of which a connection order is set by the plans, identifying an end point of a goal action when there is dependency between the actions having different end points, performing actions belonging to an end point other than the end point of the goal action to shrink and update a plan establishing and/or setting an execution order of the actions for performing an intent, delivering the updated plan to an end point performing the goal action, and performing actions belonging to the end point performing the goal action and performing the goal action.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
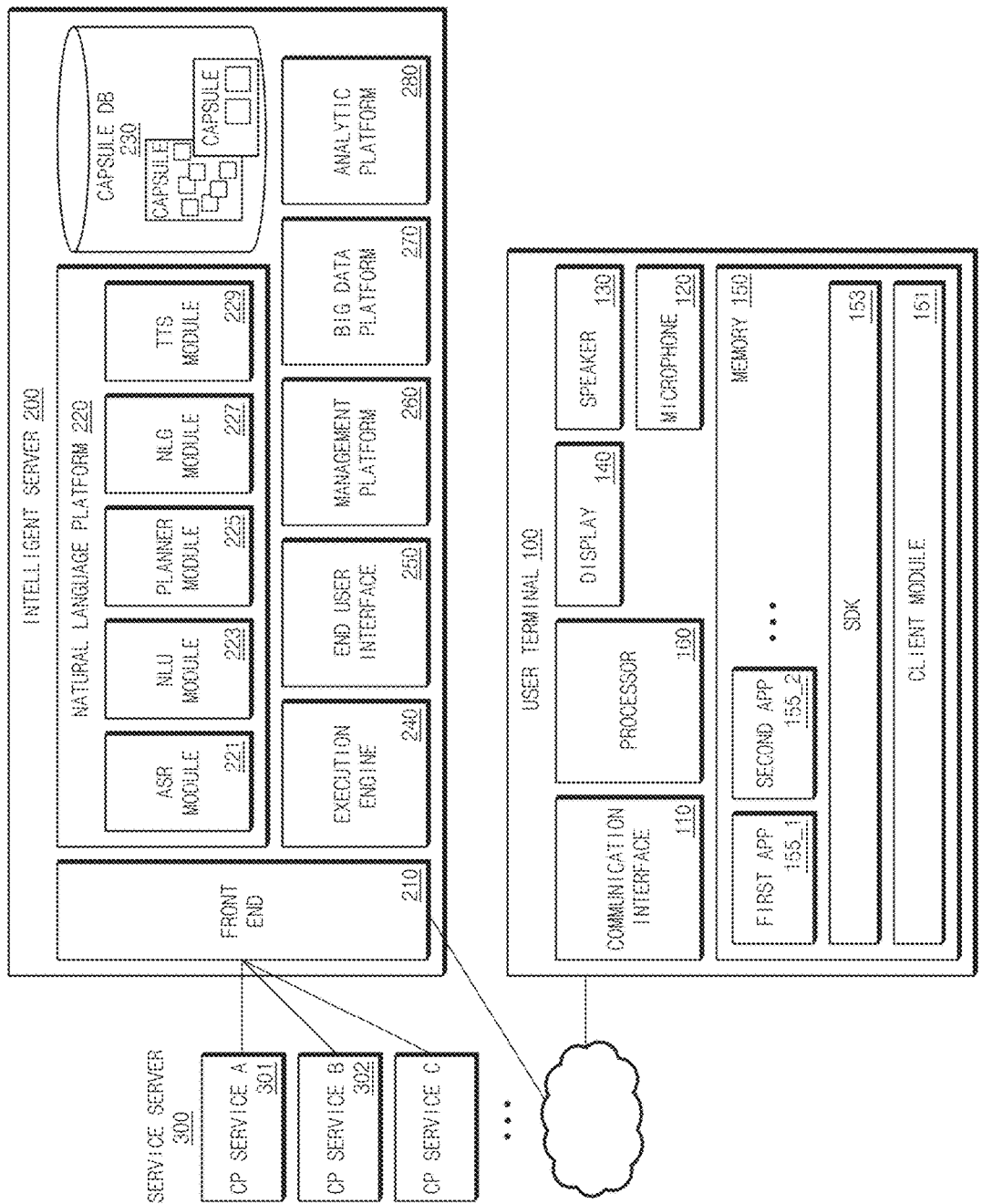
FIG. 1 is a block diagram illustrating an integrated intelligence system, according to an embodiment of the disclosure.

FIG. 1 is a block diagram illustrating an integrated intelligence system, according to an embodiment of the disclosure.

Referring to FIG. 1, an integrated intelligence system 10 according to an embodiment may include a user terminal 100, an intelligence server 200, and a service server 300.

The user terminal 100 according to an embodiment may be a terminal device (or an electronic apparatus) capable of connecting to Internet, and may be, for example, a mobile phone, a smartphone, a personal digital assistant (PDA), a notebook computer, TV, a white household appliance, a wearable device, a head mount display (HMD), or a smart speaker.

According to the illustrated embodiment, the user terminal 100 may include a communication interface 110, a microphone 120, a speaker 130, a display 140, a memory 150, or a processor 160. The listed components may be operatively or electrically connected to one another.

According to an embodiment, the communication interface 110 may be configured to transmit or receive data to or from an external device. According to an embodiment, the microphone 120 may receive a sound (e.g., a user utterance) to convert the sound into an electrical signal. According to an embodiment, the speaker 130 may output the electrical signal as a sound (e.g., voice). According to an embodiment, the display 140 may be configured to display an image or a video. According to an embodiment, the display 140 may display the graphic user interface (GUI) of the running app (or an application program).

According to an embodiment, the memory 150 may store a client module 151, a software development kit (SDK) 153, and a plurality of apps 155. The client module 151 and the SDK 153 may constitute a framework (or a solution program) for performing general-purposed functions. Furthermore, the client module 151 or the SDK 153 may constitute the framework for processing a voice input.

According to an embodiment, the plurality of apps 155 in the memory 150 may be a program for performing the specified function. According to an embodiment, the plurality of apps 155 may include a first app 155_1 and a second app 155_2. According to an embodiment, each of the plurality of apps 155 may include a plurality of actions for performing the specified function. For example, the apps may include an alarm app, a message app, and/or a schedule app. According to an embodiment, the plurality of apps 155 may be executed by the processor 160 to sequentially execute at least part of the plurality of actions.

According to an embodiment, the processor 160 may control overall operations of the user terminal 100. For example, the processor 160 may be electrically connected to the communication interface 110, the microphone 120, the speaker 130, and the display 140 to perform a specified action.

According to an embodiment, the processor 160 may also execute the program stored in the memory 150 to perform the specified function. For example, the processor 160 may execute at least one of the client module 151 or the SDK 153 to perform the following actions for processing a voice input. The processor 160 may control the actions of the plurality of apps 155 via the SDK 153. The following actions described as the actions of the client module 151 or the SDK 153 may be the action by the execution of the processor 160.

According to an embodiment, the client module 151 may receive a voice input. For example, the client module 151 may receive a voice signal corresponding to a user utterance detected via the microphone 120. The client module 151 may transmit the received voice input to the intelligence server 200. The client module 151 may transmit the state information of the user terminal 100 together with the received voice input, to the intelligence server 200. For example, the state information may be the execution state information of an app.

According to an embodiment, the client module 151 may receive the result corresponding to the received voice input. For example, when calculating the result corresponding to the received voice input from the intelligence server 200, the client module 151 may receive the result corresponding to the received voice input from the intelligence server 200. The client module 151 may display the received result in the display 140.

According to an embodiment, the client module 151 may receive the plan corresponding to the received voice input. The client module 151 may display the result of executing a plurality of actions of an app in the display 140 depending on the plan. For example, the client module 151 may sequentially display the execution result of a plurality of actions in a display. For another example, the user terminal 100 may display only a part of results (e.g., the result of the last action) of executing a plurality of actions, on the display.

According to an embodiment, the client module 151 may receive a request for obtaining information necessary to calculate the result corresponding to a voice input, from the intelligence server 200. According to an embodiment, the client module 151 may transmit the necessary information to the intelligence server 200 in response to the request.

According to an embodiment, the client module 151 may transmit information about the result of executing a plurality of actions depending on the plan, to the intelligence server 200. The intelligence server 200 may determine that the received voice input is processed correctly, using the result information.

According to an embodiment, the client module 151 may include a voice recognition module. According to an embodiment, the client module 151 may recognize a voice input to perform the limited function, via the voice recognition module. For example, the client module 151 may launch an intelligence app that processes a voice input for performing an organic action, via a specified input (e.g., wake up!).

According to an embodiment, the intelligence server 200 may receive the information associated with a user's voice input from the user terminal 100 over a communication network. According to an embodiment, the intelligence server 200 may change the data associated with the received voice input to text data. According to an embodiment, the intelligence server 200 may generate a plan for performing a task corresponding to a user voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the intelligence server 200 may transmit the result according to the generated plan to the user terminal 100 or may transmit the generated plan to the user terminal 100. According to an embodiment, the user terminal 100 may display the result according to the plan, on a display. According to an embodiment, the user terminal 100 may display the result of executing the action according to the plan, on the display.

The intelligence server 200 according to an embodiment may include a front end 210, a natural language platform 220, a capsule DB 230, an execution engine 240, an end user interface 250, a management platform 260, a big data platform 270, or an analytic platform 280.

According to an embodiment, the front end 210 may receive a voice input received from the user terminal 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text to speech module (TTS) module 229.

According to an embodiment, the ASR module 221 may convert the voice input received from the user terminal 100 to text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to an intent.

According to an embodiment, the planner module 225 may generate the plan by using the intent and a parameter, which are determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or the result value output by the execution of the plurality of actions. The parameter and the result value may be defined as a concept of the specified form (or class). As such, the plan may include the plurality of actions and a plurality of concepts determined by the intent of the user. The planner module 225 may determine the relationship between the plurality of actions and the plurality of concepts stepwise (or hierarchically). For example, the planner module 225 may determine the execution sequence of the plurality of actions, which are determined based on a user's intent, based on the plurality of concepts. In other words, the planner module 225 may determine the execution sequence of the plurality of actions, based on the parameters necessary to perform the plurality of actions and the result output by the execution of the plurality of actions. As such, the planner module 225 may generate a plan including information (e.g., ontology) of the relationship between a plurality of actions and a plurality of concepts. The planner module 225 may generate the plan, using the information stored in the capsule DB 230 storing a set of relationships between concepts and actions.

According to an embodiment, the NLG module 227 may change the specified information into information in the text form. The information changed to the text form may be a form of a natural language utterance. The TTS module 229 according to an embodiment may change information of the text form to information of a voice form.

According to an embodiment, all or part of functions of the natural language platform 220 may be implemented in the user terminal 100.

The capsule DB 230 may store information about the relationship between the actions and the plurality of concepts corresponding to a plurality of domains. The capsule according to an embodiment may include a plurality of action objects (or action information) and concept objects (or concept information) included in the plan. According to an embodiment, the capsule DB 230 may store the plurality of capsules in the form of a concept action network (CAN). According to an embodiment, the plurality of capsules may be stored in the function registry included in the capsule DB 230.

The capsule DB 230 may include a strategy registry that stores strategy information necessary to determine a plan corresponding to a voice input. The strategy information may include reference information for determining a single plan when there are a plurality of plans corresponding to the voice input. According to an embodiment, the capsule DB 230 may include a follow up registry that stores the information of the follow-up action for suggesting a follow-up action to the user in the specified context. For example, the follow-up action may include a follow-up utterance. According to an embodiment, the capsule DB 230 may include a layout registry for storing layout information of the information output via the user terminal 100. According to an embodiment, the capsule DB 230 may include a vocabulary registry that stores vocabulary information included in the capsule information. According to an embodiment, the capsule DB 230 may include a dialog registry that stores information about dialog (or interaction) with the user. The capsule DB 230 may update the stored object via a developer tool. For example, the developer tool may include a function editor for updating an action object or a concept object. The developer tool may include a vocabulary editor for updating the vocabulary. The developer tool may include a strategy editor that generates and registers a strategy for determining the plan. The developer tool may include a dialog editor that creates a dialog with the user. The developer tool may include a follow up editor capable of activating the follow-up target and editing the follow-up utterance for providing a hint. The follow-up target may be determined based on the currently set target, the preference of the user, or environment condition. In an embodiment, the capsule DB 230 may be implemented in the user terminal 100.

According to an embodiment, the execution engine 240 may calculate the result, using the generated plan. According to an embodiment, the end user interface 250 may transmit the calculated result to the user terminal 100. As such, the user terminal 100 may receive the result and may provide the user with the received result. According to an embodiment, the management platform 260 may manage information used by the intelligence server 200. According to an embodiment, the big data platform 270 may collect data of the user. According to an embodiment, the analytic platform 280 may manage the quality of service (QoS) of the intelligence server 200. For example, the analytic platform 280 may manage the component and processing speed (or efficiency) of the intelligence server 200.

According to an embodiment, the service server 300 may provide the user terminal 100 with a specified service (e.g., food order or hotel reservation). According to an embodiment, the service server 300 may be a server operated by the third party. According to an embodiment, the service server 300 may provide the intelligence server 200 with information for generating a plan corresponding to the received voice input. The provided information may be stored in the capsule DB 230. Furthermore, the service server 300 may provide the intelligence server 200 with result information according to the plan.

In the above-described integrated intelligence system 10, the user terminal 100 may provide the user with various intelligent services in response to a user input. The user input may include, for example, an input through a physical button, a touch input, or a voice input.

According to an embodiment, the user terminal 100 may provide a speech recognition service via an intelligence app (or a speech recognition app) stored therein. In this case, for example, the user terminal 100 may recognize the user utterance or the voice input received via the microphone and may provide the user with a service corresponding to the recognized voice input.

According to an embodiment, the user terminal 100 may perform a specified action, based on the received voice input, exclusively, or together with the intelligence server and/or the service server. For example, the user terminal 100 may execute an app corresponding to the received voice input and may perform the specified action via the executed app.

According to an embodiment, when the user terminal 100 provides a service together with the intelligence server 200 and/or the service server, the user terminal may detect a user utterance, using the microphone 120 and may generate a signal (or voice data) corresponding to the detected user utterance. The user terminal may transmit the voice data to the intelligence server 200, using the communication interface 110.

According to an embodiment, the intelligence server 200 may generate a plan for performing a task corresponding to the voice input or the result of performing an action depending on the plan, as the response to the voice input received from the user terminal 100. For example, the plan may include a plurality of actions for performing the task corresponding to the voice input of the user and a plurality of concepts associated with the plurality of actions. The concept may define a parameter to be input for the execution of the plurality of actions or a result value output by the execution of the plurality of actions. The plan may include relationship information between a plurality of actions and a plurality of concepts.

According to an embodiment, the user terminal 100 may receive the response, using the communication interface 110. The user terminal 100 may output the voice signal generated in user terminal 100, to the outside using the speaker 130 or may output an image generated in the user terminal 100, to the outside using the display 140.

Figure 2:
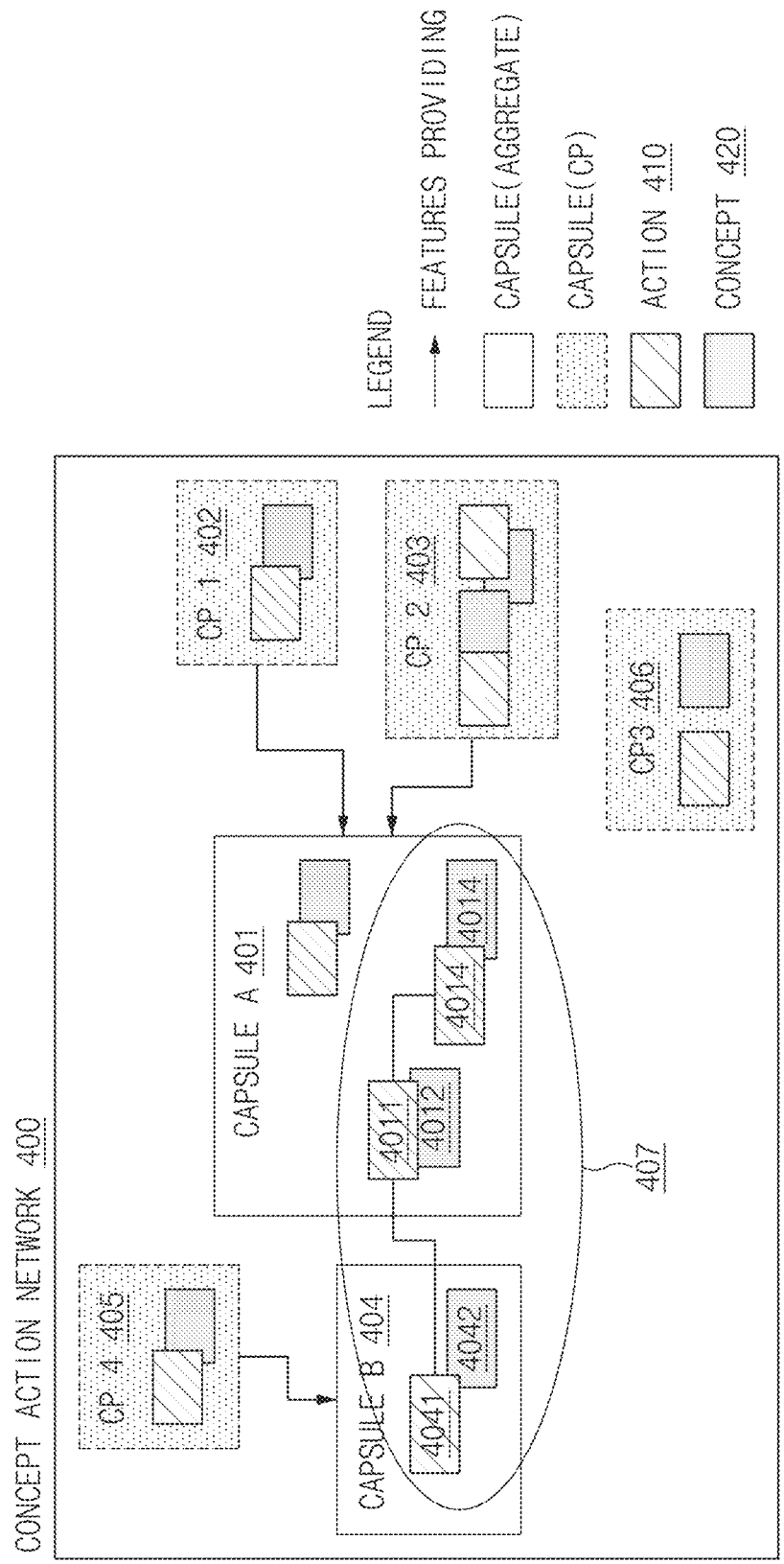
FIG. 2 is a diagram illustrating the form in which relationship information between a concept and an action is stored in a database, according to an embodiment of the disclosure.

FIG. 2 is a diagram 400 illustrating a form in which relationship information between a concept and an action is stored in a database, according to an embodiment of the disclosure.

Referring to FIG. 2, the capsule database (e.g., the capsule DB 230) of the intelligence server 200 may store a capsule in the form of a concept action network (CAN). The capsule database may store an action for processing a task corresponding to a voice input and a parameter necessary for the action, in the CAN form.

The capsule database may store a plurality of capsules (e.g., capsule A 401 and capsule B 404) respectively corresponding to a plurality of domains (e.g., applications). According to an embodiment, a single capsule (e.g., the capsule A 401) may correspond to one domain (e.g., geo or application). Furthermore, the single capsule may correspond to at least one service provider (e.g., CP 1 402, CP 2 403, CP 3 406, or CP 4 405) for performing the function of the domain associated with the capsule. According to an embodiment, the single capsule may include at least one or more actions 410 and at least one or more concepts 420 for performing a specified function.

The natural language platform 220 may generate a plan for performing a task corresponding to the received voice input, using the capsule stored in the capsule database. For example, the planner module 225 of the natural language platform may generate a plan, using the capsule stored in the capsule database. For example, a plan 407 may be generated using actions 4011 and 4013 and concepts 4012 and 4014 of the capsule A 401 and an action 4041 and a concept 4042 of the capsule B 404.

Figure 3:
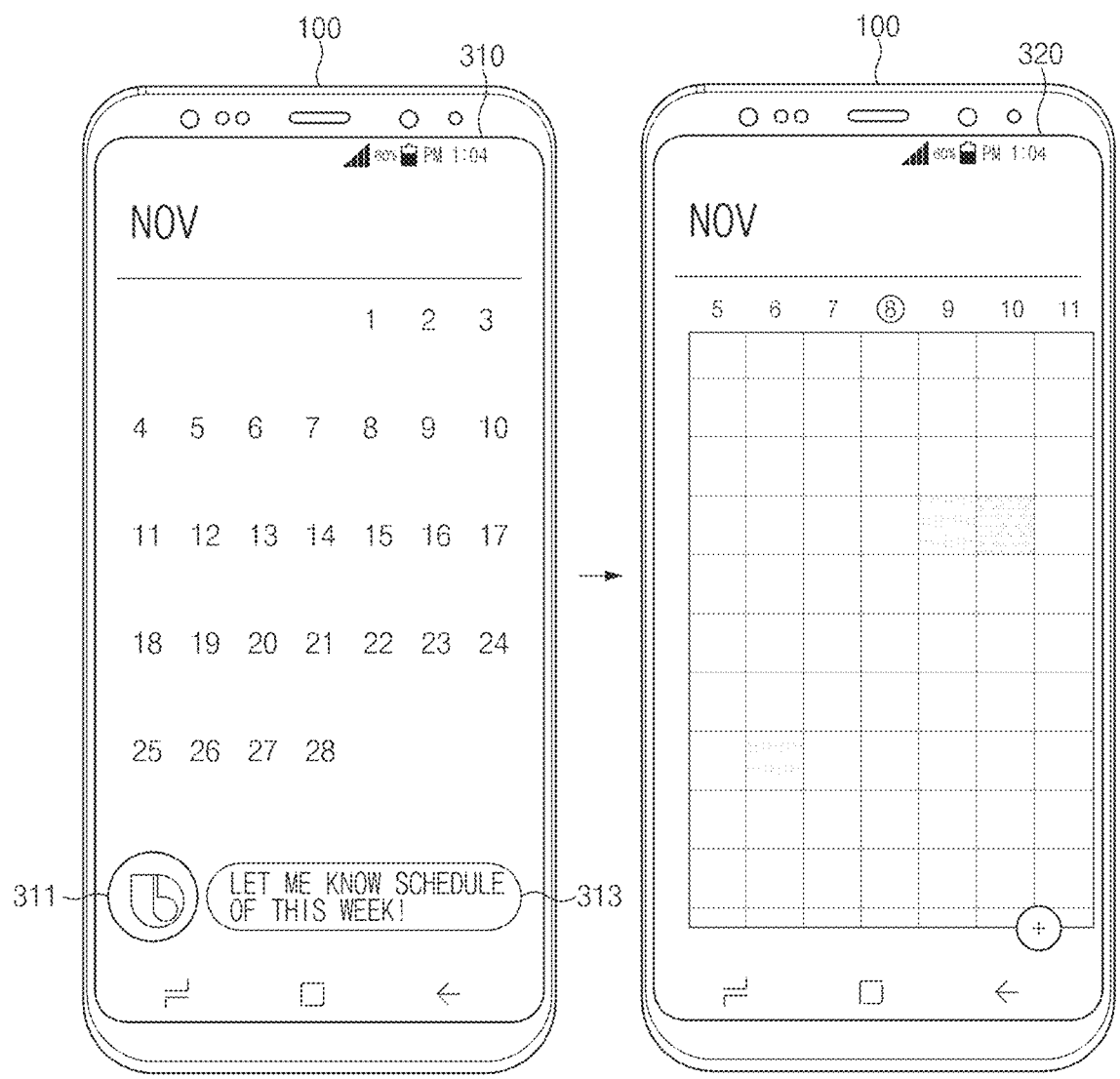
FIG. 3 is a view illustrating a user terminal displaying a screen of processing a voice input received through an intelligence app, according to an embodiment of the disclosure.

FIG. 3 is a view illustrating a user terminal displaying a screen for processing a voice input received through an intelligence app, according to an embodiment of the disclosure.

Referring to FIG. 3, the user terminal 100 may execute an intelligence app to process a user input through the intelligence server 200.

According to an embodiment, in screen 310, when recognizing a specified voice input (e.g., wake up!) or receiving an input via a hardware key (e.g., the dedicated hardware key), the user terminal 100 may launch an intelligence app for processing a voice input. For example, the user terminal 100 may launch an intelligence app in a state in which a schedule app is being executed. According to an embodiment, the user terminal 100 may display an object (e.g., an icon) 311 corresponding to the intelligence app, in the display 140. According to an embodiment, the user terminal 100 may receive a voice input by a user utterance. For example, the user terminal 100 may receive a voice input saying that "Let me know the schedule of this week!". According to an embodiment, the user terminal 100 may display a user interface (UI) 313 (e.g., an input window) of an intelligence app, in which text data of the received voice input is displayed, in a display According to an embodiment, in screen 320, the user terminal 100 may display the result corresponding to the received voice input, in the display. For example, the user terminal 100 may receive the plan corresponding to the received user input and may display 'the schedule of this week' in the display depending on the plan.

Figure 4:
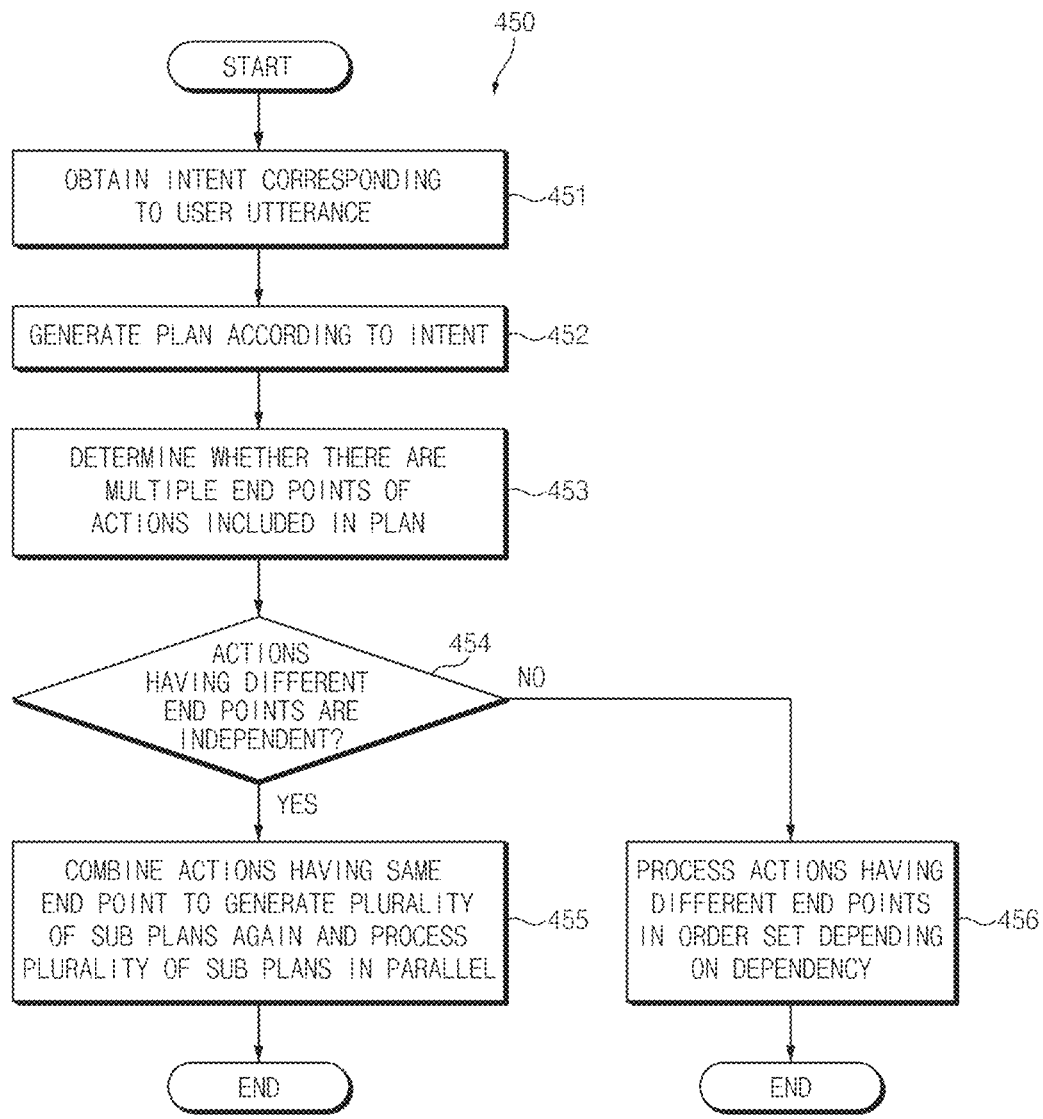
FIG. 4 is a flowchart illustrating a procedure of processing a plan including multiple end points, according to an embodiment of the disclosure.

FIG. 4 is a flowchart 450 illustrating a procedure of processing a plan including a plurality of end points, according to an embodiment of the disclosure.

Referring to FIG. 4, in an embodiment, the end point may be a point to which the client module 151 is connected to perform an action included in a plan. The end point, as the part where the action is performed, may be the user terminal 100 or the intelligence server 200 depending on the type of action to be performed. For example, when a single action uses the information stored inside the user terminal 100, the end point of the corresponding action may be the user terminal 100; when another action uses the information stored inside the intelligence server 200, the end point of the corresponding action may be the intelligence server 200.

In operation 451, the intelligence server 200 according to an embodiment may obtain the intent corresponding to a user utterance. The intent may be an operation to be performed through the utterance and/or the result to be achieved. The user terminal 100 may provide various content services based on the user intent or may perform various functions included in the user terminal 100.

In operation 452, the intelligence server 200 according to an embodiment may generate the plan according to the intent. The plan may set the connection order of actions for performing the intent. For example, the planner module 225 of the intelligence server 200 may establish the plan for performing operations corresponding to the intent. The actions may be inside a capsule. The capsule may be an application or program including operations corresponding to the intent. The capsule may include concepts and/or actions for performing operations. The storage location of the capsule including the corresponding action may be set depending on the end point that the action included in the capsule has.

In operation 453, the intelligence server 200 according to an embodiment may determine whether there are multiple end points of actions included in the plan. When some of the actions included in the plan are performed by the user terminal 100 using the information stored inside the user terminal 100 and when the remaining actions are performed by the intelligence server 200 using the information stored in the intelligence server 200, it may be determined that the plan has multiple end points because the plan has two end points of the user terminal 100 and the intelligence server 200.

In operation 454, the intelligence server 200 according to an embodiment may determine whether actions having different end points are independent. When the cause and/or result of a single action is independent of the cause and/or result of another action, the two actions may be independent of each other. The intelligence server 200 may determine whether the action having the user terminal 100 as an end point and the action having the intelligence server 200 as an end point are independent.

According to an embodiment, in operation 455, when actions with different end points are independent, the user terminal 100 and/or the intelligence server 200 may combine actions having the same end point to generate a plurality of sub plans again and may process a plurality of sub plans in parallel. When the actions having different end points are independent, the user terminal 100 and/or the intelligence server 200 may generate a sub plan by collecting actions having the same end point. The user terminal 100 and/or the intelligence server 200 may process each of the plurality of sub plans. For example, the user terminal 100 may generate and process a single sub plan, using actions having the user terminal 100 as an end point; the intelligence server 200 may generate another sub plan, using the actions having the intelligence server 200 as an end point to process the other sub plan in parallel.

According to an embodiment, in operation 456, the user terminal 100 and/or the intelligence server 200 may process actions having different end points in the order set depending on dependency. When the actions having different end points have the dependency, the user terminal 100 and/or the intelligence server 200 may sequentially process actions having different end points.

Figure 5:
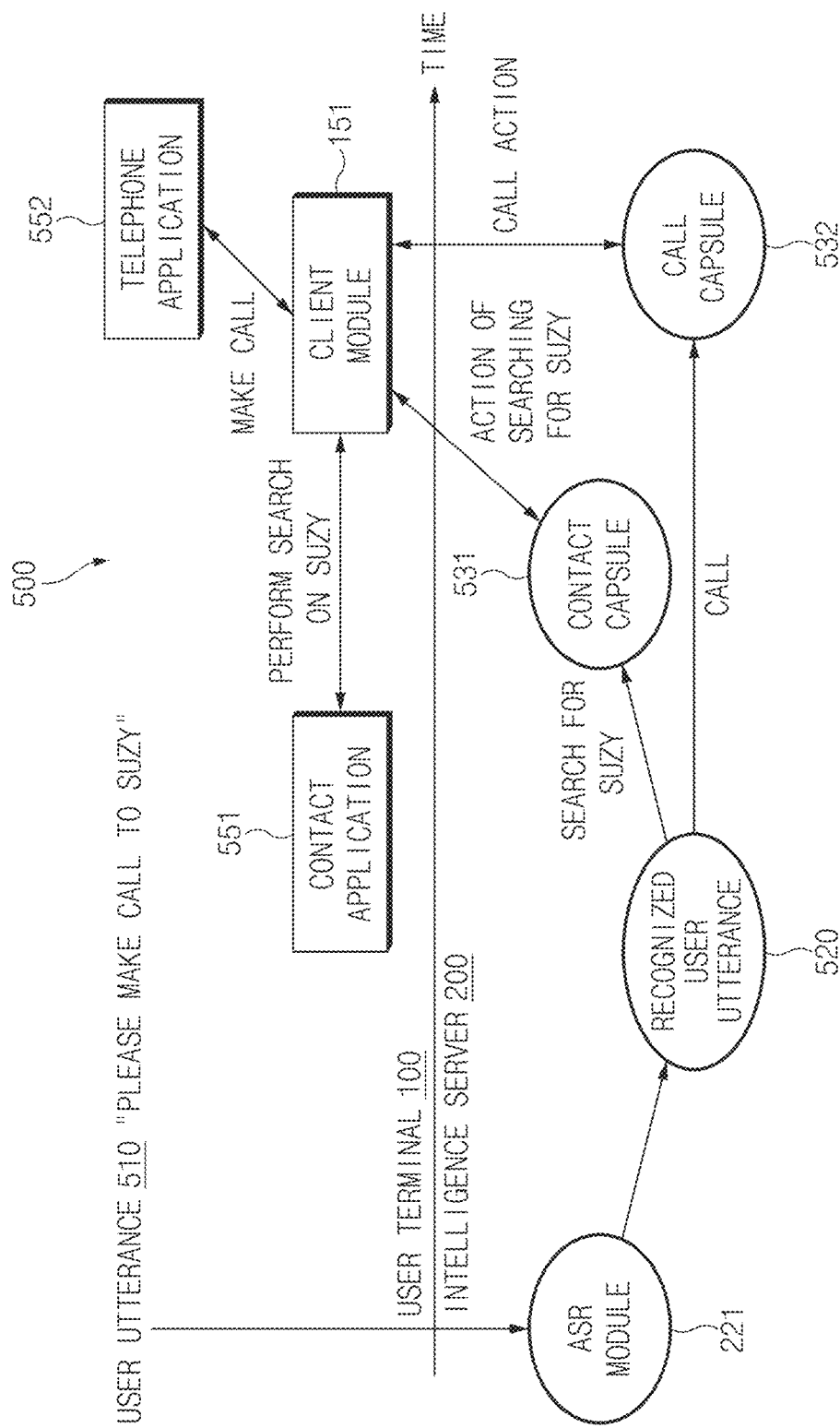
FIG. 5 is a diagram illustrating a procedure of establishing a plan for setting a connection order of pieces of information included in a plurality of capsules and performing an operation, according to an embodiment of the disclosure.

FIG. 5 is a diagram 500 illustrating a procedure of establishing a plan for setting a connection order of pieces of information included in a plurality of capsules and performing an operation, according to an embodiment of the disclosure. In the following exemplifications of processing an utterance through setting the connection order of pieces of information included in the plurality of capsules, the description of FIG. 5 associated with the plurality of capsules may be substantially the same.

Referring to FIG. 5, in an embodiment, a user utterance 510 may be entered into the user terminal 100. The user utterance 510 may include the intent for performing an operation. For example, the user utterance saying that "please make a call to Suzy." may include the intent of searching for "Suzy" to find a telephone number and the intent of making a call. The user terminal 100 may deliver the user utterance 510 to the intelligence server 200.

In an embodiment, the user utterance 510 may be recognized after being converted into a text by the ASR module 221. A recognized user utterance 520 may be entered after being divided into one or more capsules.

In an embodiment, the intent of the user utterance 520 recognized as the capsule, which corresponds to the intent, from among a plurality of capsules included in the intelligence server 200 may be entered. For example, the intent of searching for "Suzy" to find a telephone number may be transmitted to a contact capsule 531 in the capsules included in the intelligence server 200 and then the intent of making a call through a call capsule 532 may be transmitted to a call capsule 532.

In an embodiment, the capsule may connect the received intent to the concept corresponding to the intent. The concept may make it possible to perform an action corresponding to the received intent. The concept may transmit and/or receive a signal such that the client module 151 performs the action according to the intent. For example, the contact capsule 531 may transmit and/or receive a signal for performing an action of searching for "Suzy" to find a telephone number with the client module 151; the call capsule 532 may transmit and/or receive a signal for performing an action of making a call with the client module 151.

In an embodiment, the client module 151 may perform an action by controlling an application of the user terminal 100. For example, the client module 151 may perform an action of searching for "Suzy" to find a telephone number, using the contact application 551 and may perform an action of making a call, using the telephone application 552.

Figure 6:
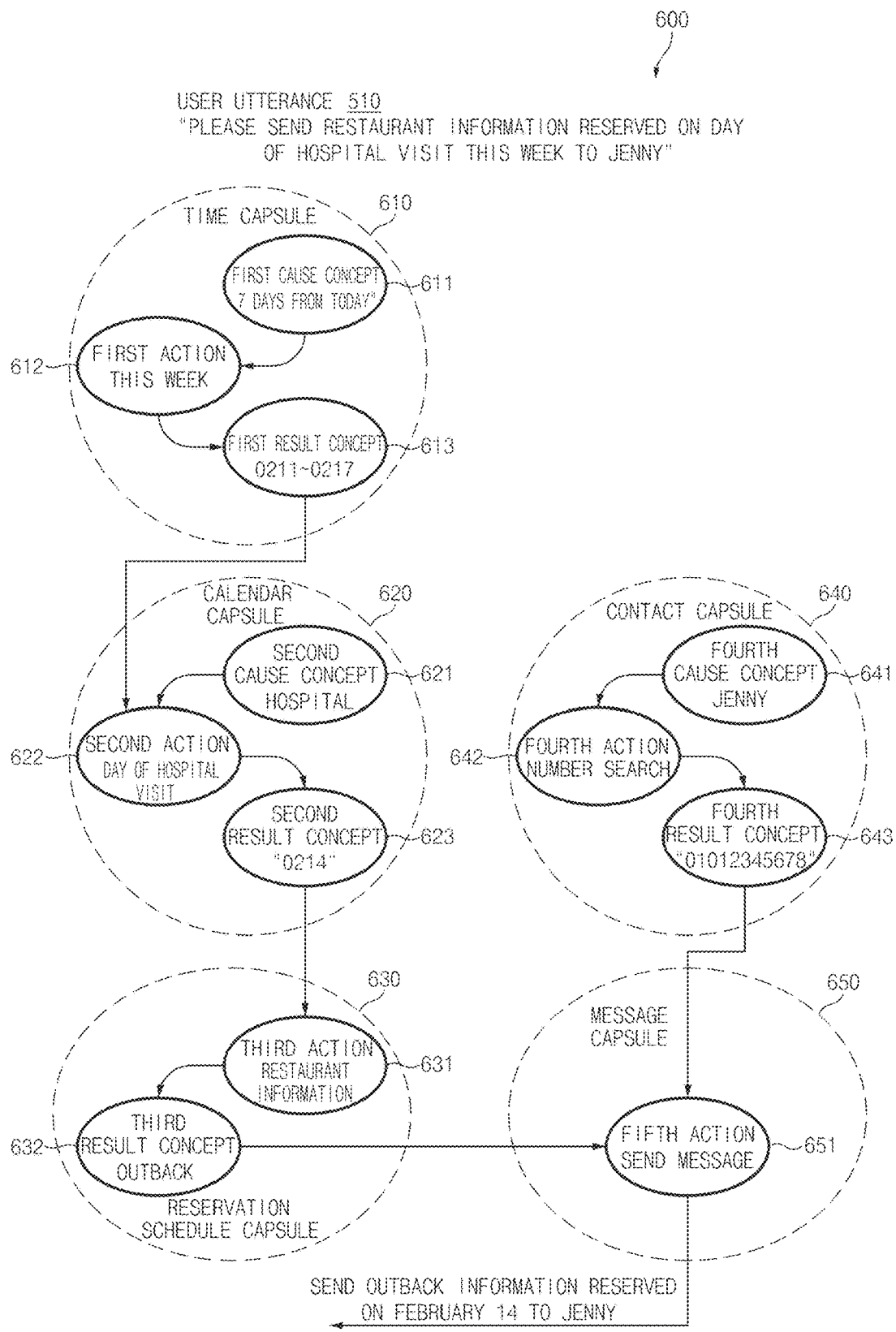
FIG. 6 is a diagram illustrating a procedure of processing a plan including multiple end points, according to an embodiment of the disclosure.

FIG. 6 is a diagram 600 illustrating a procedure of processing a plan including multiple end points, according to an embodiment of the disclosure. In the following exemplifications of processing an utterance including multiple end points, the description of FIG. 6 associated with multiple end points may be substantially the same. Furthermore, an embodiment is exemplified in FIG. 6 as a procedure of processing a plan. However, an embodiment of the disclosure is not limited thereto. The concept or content described with reference to FIG. 6 may be substantially applied to the procedure of processing actions having different end points when a plurality of actions corresponding to a domain or deep link are processed.

Referring to FIG. 6, in an embodiment, when the user utterance 510 is entered, the planner module 225 may establish a plan for performing an operation corresponding to the user utterance 510. For example, when the user utterance 510 saying that "please send restaurant information reserved on the day of hospital visit this week to Jenny" is entered, the planner module 225 may establish a plan for sending the restaurant information reserved on the day of the hospital visit this week to Jenny through a message.

In an embodiment, the plan may include a plurality of capsules 610, 620, 630, 640, and 650. For example, the plan may include a time capsule 610, a calendar capsule 620, a reservation schedule capsule 630, a contact capsule 640, and/or a message capsule 650. The plan may set the processing order and/or processing method of concepts and/or actions included in the plurality of capsules 610, 620, 630, 640, and 650.

In an embodiment, the time capsule 610 may include a first cause concept 611, a first action 612, and/or a first result concept 613. The first cause concept 611 may transmit, to the first action 612, a condition of "7 days from today", which is to be analyzed by the time capsule 610, in user utterance 601. The first action 612 may process the condition of "7 days from today" to deliver the result for "this week" to the first result concept 613. The first result concept 613 may calculate "0211~0217", which is the result of "this week", to transmit "0211~0217" to a second action 622.

In an embodiment, the calendar capsule 620 may include a second cause concept 621, the second action 622, and/or a second result concept 623. The second cause concept 621 may transmit, to the second action 622, information saying that "hospital" to be found by the calendar capsule 620, in the user utterance 601. The second action 622 may search for "the day of hospital visit" to transmit the found result to the second result concept 623. The second result concept 623 may deliver "0214" being "the day of hospital visit" to a third action 631.

In an embodiment, the reservation schedule capsule 630 may include the third action 631, and/or a third result concept 632. The third action 631 may search for the reserved "restaurant information" to deliver the reserved "restaurant information" to the third result concept 632. The third result concept 632 may deliver "outback" that is the reserved restaurant, to a fifth action 651.

In an embodiment, the contact capsule 640 may include a fourth cause concept 641, a fourth action 642, and/or a fourth result concept 643. The fourth cause concept 641 may transmit the information of "Jenny", which is to be found by the contact capsule 640, in the user utterance 601 to the fourth action 642. The fourth action 642 may perform a task of "number search" to deliver the result to the fourth result concept 643. The fourth result concept 643 may generate Jenny's telephone number of "01012345678" and may transmit the Jenny's telephone number to the fifth action 651.

In an embodiment, the message capsule 650 may include the fifth action 651. The fifth action 651 may perform a goal action of "sending outback information reserved on February 14 to Jenny".

In an embodiment, the first action 612 included in the time capsule 610 and the third action 631 included in the reservation schedule capsule 630 may be performed by the intelligence server 200; the second action 622 included in the calendar capsule 620, the fourth action 642 included in the contact capsule 640, and the fifth action 651 included in the message capsule 650 may be performed by the user terminal 100. In the case where the actions included in the plurality of capsules 610, 620, 630, 640, and 650 have different end points, when a single action is performed at a single end point, other end points may maintain an idle state. Furthermore, when the actions included in the plurality of capsules 610, 620, 630, 640, and 650 have different end points, while executing a plan, the client module 151 may repeat the interaction between the user terminal 100 and/or the intelligence server 200 the number of times or the client module 151 may repeatedly establish the connection between the user terminal 100 and/or the intelligence server 200.

Figure 7:
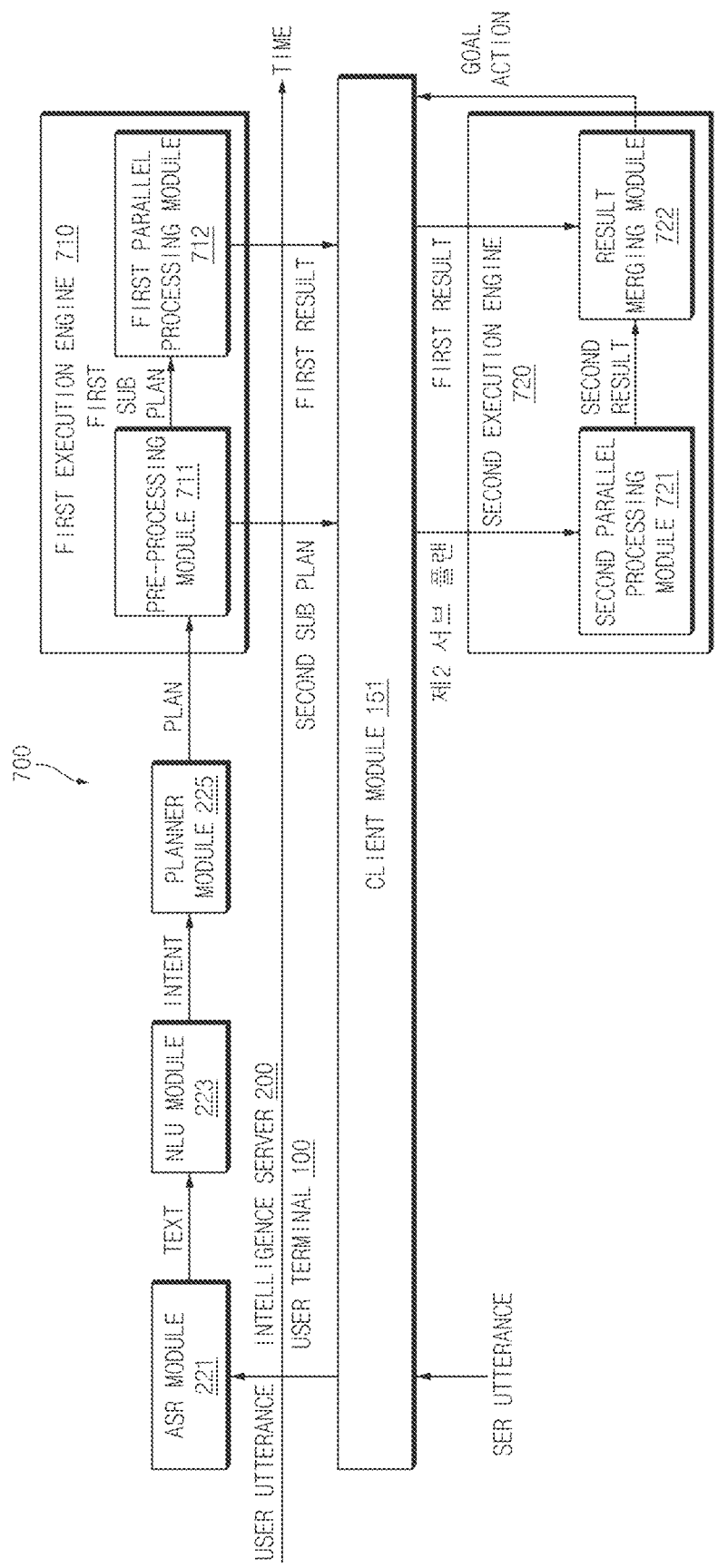
FIG. 7 is a diagram illustrating a procedure of processing sub plans in parallel when actions having different end points are independent of one another, according to an embodiment of the disclosure.

FIG. 7 is a diagram 700 illustrating a procedure of processing sub plans in parallel when actions having different end points are independent of one another, according to an embodiment of the disclosure;

Referring to FIG. 7, in an embodiment, the client module 151 of the user terminal 100 may receive a user utterance. The client module 151 may transmit the user utterance to the ASR module 221 of the intelligence server 200.

In an embodiment, the ASR module 221 may receive the user utterance from the client module 151. The ASR module 221 may convert the user utterance into a text. The ASR module 221 may deliver the text to the NLU module 223.

In an embodiment, the NLU module 223 may receive the text from the ASR module 221. The NLU module 223 may extract the intent included in the text. The NLU module 223 may deliver the intent to the planner module 225.

In an embodiment, the planner module 225 may receive the intent from the NLU module 223. The planner module 225 may establish the plan for performing the action and/or operation corresponding to the intent. The planner module 225 may deliver the established plan to a first execution engine 710.

In an embodiment, the first execution engine 710 may divide a plurality of actions included in the plan depending on an end point. The first execution engine 710 may process actions having the end point to the intelligence server 200. The first execution engine 710 may include a pre-processing module 711 and/or a first parallel processing module 712.

In an embodiment, the pre-processing module 711 may divide a plurality of actions included in the plan depending on an end point. The pre-processing module 711 may classify actions, in each of which the user terminal 100 is an end point, and actions, in each of which the intelligence server 200 is an end point. When it is determined that there is no dependency between actions having different end points, the pre-processing module 711 may separate actions having different end points.

In an embodiment, the pre-processing module 711 may generate a first sub plan, using actions, in each of which the intelligence server 200 is an end point. The pre-processing module 711 may generate a second sub plan, using actions, in each of which the user terminal 100 is an end point. The pre-processing module 711 may deliver the first sub plan to the first parallel processing module 712 of the intelligence server 200. The pre-processing module 711 may deliver the second sub plan to the client module 151 of the user terminal 100. The pre-processing module 711 may allow the user terminal 100 and the intelligence server 200 to process the first sub plan and the second sub plan in parallel.

In an embodiment, the first parallel processing module 712 may process actions included in the first sub plan. The first parallel processing module 712 may process the first sub plan to generate the first result. The first parallel processing module 712 may deliver the first result to the client module 151.

In an embodiment, the client module 151 may deliver the second sub plan and/or the first result to a second execution engine 720 of the user terminal 100. The second execution engine 720 may process actions having the user terminal 100 as an end point and may generate a goal action by reflecting the first result. The second execution engine 720 may include a second parallel processing module 721 and/or a result merging module 722.

In an embodiment, the second parallel processing module 721 may receive a second sub plan. The second parallel processing module 721 may process the second sub plan to generate the second result. The second parallel processing module 721 may deliver the second result to the result merging module 722.

In an embodiment, the result merging module 722 may receive the first result from the client module 151. The result merging module 722 may receive the second result from the second parallel processing module 721. The result merging module 722 may merge the first result and the second result, which are processed in parallel. The result merging module 722 may generate the goal action, using the first result and the second result. The result merging module 722 may deliver the goal action to the client module 151.

Figure 8:
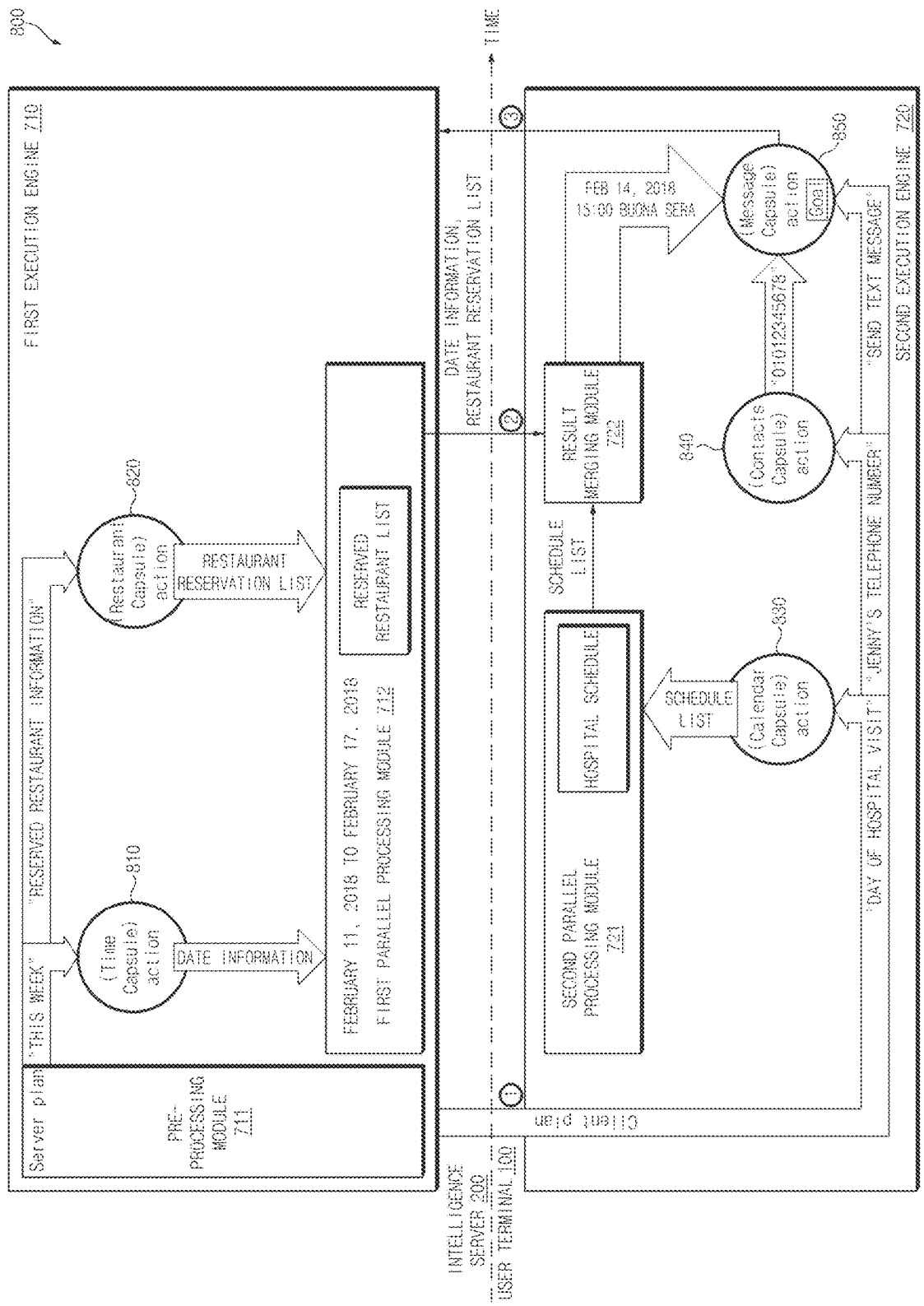
FIG. 8 is a diagram illustrating a procedure of processing an utterance in which actions having different end points are independent, according to an embodiment of the disclosure.

FIG. 8 is a diagram 800 illustrating a procedure of processing an utterance in which actions having different end points are independent, according to an embodiment of the disclosure.

Referring to FIG. 8, in an embodiment, the pre-processing module 711 may deliver actions of "this week" and "reserved restaurant information" constituting a server plan having the intelligence server 200 as an end point, in a plan, to capsules 810 and 820 included in the first execution engine 710. The pre-processing module 711 may deliver actions of "the day of hospital visit", "Jenny's telephone number", "send a text message" constituting the client plan having the user terminal 100 as an end point in the plan, to capsules 830, 840, and 850 included in the second execution engine 720. (Step 1)

In an embodiment, each of the capsules 810 and 820 included in the first execution engine 710 may generate date information and restaurant reservation list in response to the received actions of "this week" and "reserved restaurant information" and may generate concepts of "Feb. 11, 2018 to Feb. 17, 2018" and "reserved restaurant list". Each of the capsules 830, 840, and 850 included in the second execution engine 720 in parallel with the first execution engine 710 may generate the concepts of "list", "01012345678", and "sending a message for performing a goal action", which correspond to the received actions of "the day of hospital visit", "Jenny's telephone number", and "send a text message".

In an embodiment, each of the capsules 810 and 820 included in the first execution engine 710 may deliver the generated concepts to the first parallel processing module 712. The first parallel processing module 712 may generate the first result for the date information and the restaurant reservation list, using the received concepts. The first parallel processing module 712 may deliver the first result to the result merging module 722. (Step 2)

In an embodiment, at least part of the capsule 830 included in the second execution engine 720 may deliver the concept for the generated hospital schedule to the second parallel processing module 721. The second parallel processing module 721 may generate the second result for the hospital schedule. The second parallel processing module 721 may deliver the second result to the result merging module 722. At least part of the capsule 840 included in the second execution engine 720 may directly deliver information for performing the goal action, to the other capsule 850.

In an embodiment, the result merging module 722 may merge the first result and the second result to generate the final result of "Feb. 14, 2018 15:00 buona sera" for performing the goal action. The result merging module 722 may deliver the final result to the capsule 850 for performing the goal action.

In an embodiment, the capsule 850 for performing the goal action may achieve the goal action. The capsule 850 for achieving the goal action may deliver, to the first execution engine 710, the result including whether the goal action succeeds and/or fails. (Step 3)

Figure 9:
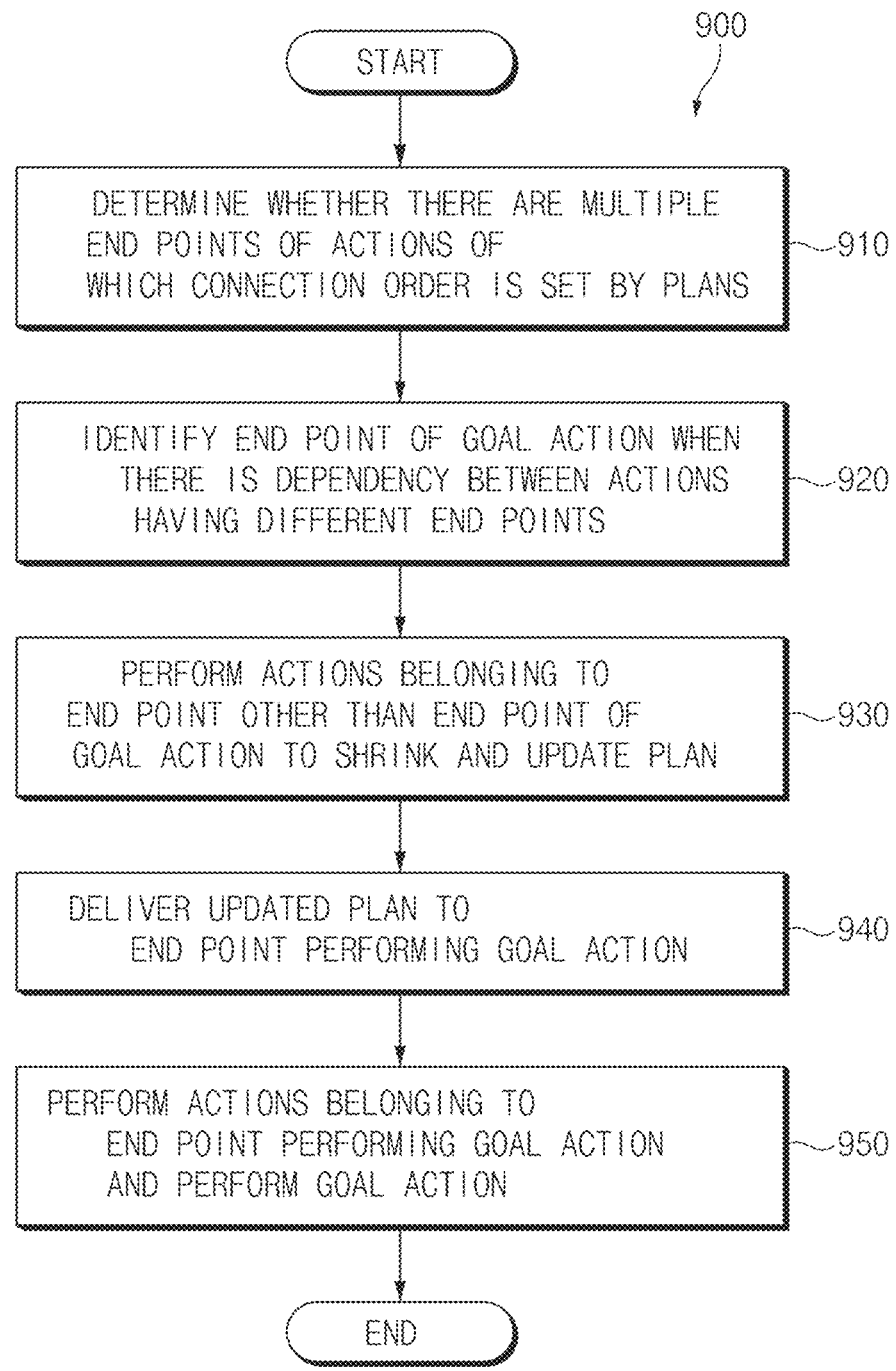
FIG. 9 is a diagram illustrating a procedure of processing a plan, in which there is dependency between actions having different end points, according to an embodiment of the disclosure.

FIG. 9 is a diagram 900 illustrating a procedure of processing a plan, in which there is dependency between actions having different end points, according to an embodiment of the disclosure.

Referring to FIG. 9, in operation 910, the intelligence server 200 according to an embodiment may determine whether there are multiple end points of actions included in the plan. When some of the actions included in the plan uses the information stored inside the user terminal 100 and when the remaining actions use the information stored in the intelligence server 200, it may be determined that the plan has multiple end points because the plan has two end points of the user terminal 100 and the intelligence server 200.

In operation 920, the intelligence server 200 according to an embodiment may identify the end point of the goal action when there is the dependency between actions having different end points. When the actions having different end points have causal relationship or when the result of a single action is used in another action, it may be determined that there is dependency between the actions. For example, in the case of actions for which execution and/or processing order is specified, it may be determined that there is dependency between the actions. In this case, it may be determined which one of the user terminal 100 or the intelligence server 200 is the end point of the goal action.

According to an embodiment, in operation 930, the user terminal 100 and/or the intelligence server 200 may perform actions belonging to the end point other than the end point of the goal action to shrink the plan and may update the shrank plan. The user terminal 100 and/or the intelligence server 200 may first perform actions having an end point different from the end point of the goal action. For example, when the user terminal 100 is the end point of the goal action, the intelligence server 200 may first perform actions having the intelligence server 200 as an end point. For another example, when the intelligence server 200 is the end point of the goal action, the user terminal 100 may first perform actions having the user terminal 100 as an end point. When actions having an end point different from the end point of the goal action are performed, the number of actions included in the plan may be reduced to shrink the plan. Furthermore, while at least part of actions is performed, the result for at least part of actions may be obtained, and thus the plan may be updated.

In an embodiment, when the actions specified by each of the domains including the deep link instead of the plan are performed, the actions belonging to the end point other than the end point of the goal action may be performed, and thus the number of actions may be reduced. Alternatively, actions corresponding to a single end point (e.g., the user terminal 100 or the intelligence server 200) may be preferentially processed to complete operations performed by one of the end point 100 or 200.

According to an embodiment, in operation 940, the user terminal 100 and/or the intelligence server 200 may deliver the updated plan to an end point performing a goal action. For example, when the user terminal 100 is the end point of the goal action, the intelligence server 200 may first perform actions having the intelligence server 200 as an end point. For another example, when the intelligence server 200 is the end point of the goal action, the user terminal 100 may first perform actions having the user terminal 100 as an end point.

In operation 950, the user terminal 100 and/or the intelligence server 200 according to an embodiment may perform actions belonging to an end point performing the goal action and may perform the goal action. For example, when the user terminal 100 is the end point of the goal action, the user terminal 100 may receive the plan shrunk by the intelligence server 200, may perform the remaining actions, and may finally perform the goal action. For another example, when the intelligence server 200 is the end point of the goal action, the intelligence server 200 may receive the plan shrunk by the user terminal 100, may perform the remaining actions, and may finally perform the goal action. In the procedure of processing the plan, when the actions included in the plan is processed by preferentially processing the action having an end point different from the end point of the goal action, the number of times that the interaction between the user terminal 100 and/or the intelligence server 200 occurs or the number of time that the connection is set again may be reduced.

Figure 10:
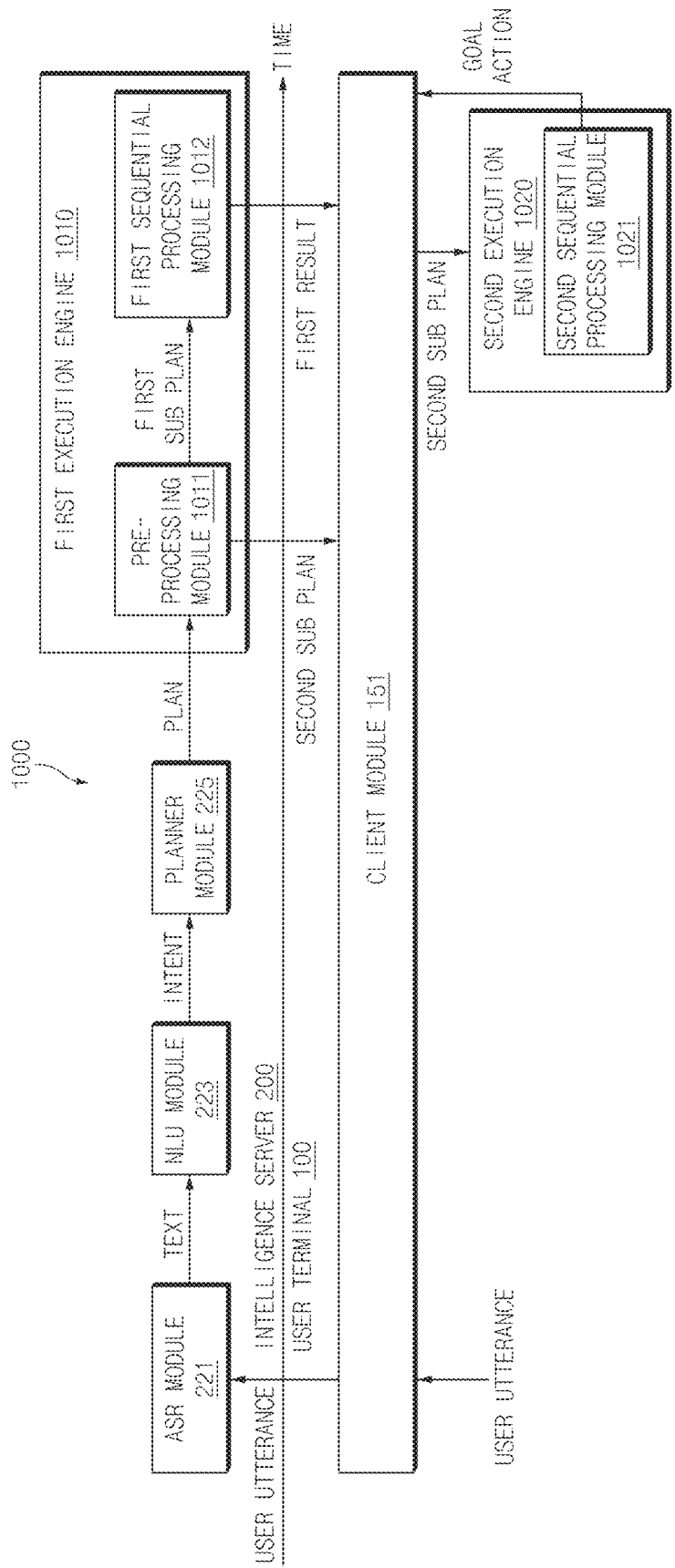
FIG. 10 is a diagram illustrating a procedure of sequentially processing sub plans when there is dependency between actions having different end points, according to an embodiment of the disclosure.

FIG. 10 is a diagram 1000 illustrating a procedure of sequentially processing sub plans when there is dependency between actions having different end points, according to an embodiment of the disclosure. The ASR module 221, the NLU module 223, and the planner module 225 of FIG. 10 are substantially the same as the ASR module 221, the NLU module 223, and the planner module 225 of FIG. 7, and a description thereof is thus omitted.

Referring to FIG. 10, in an embodiment, a first execution engine 1010 may divide a plurality of actions included in the plan depending on an end point. The first execution engine 1010 may process actions having the end point to the intelligence server 200. The first execution engine 1010 may include a pre-processing module 1011 and/or a first sequential processing module 1012.

In an embodiment, the pre-processing module 1011 may divide a plurality of actions included in the plan depending on an end point. The pre-processing module 1011 may classify actions, in each of which the user terminal 100 is an end point, and actions, in each of which the intelligence server 200 is an end point. When it is determined that there is dependency between actions having different end points, the pre-processing module 1011 may adjust an order such that actions having the same end point are first processed.

In an embodiment, the pre-processing module 1011 may generate a first sub plan, using actions, in each of which the intelligence server 200 is an end point. The pre-processing module 1011 may generate a second sub plan, using actions, in each of which the user terminal 100 is an end point. The pre-processing module 1011 may deliver the first sub plan to the first sequential processing module 1012 of the intelligence server 200. The pre-processing module 1011 may deliver the second sub plan to the client module 151 of the user terminal 100.

In an embodiment, the first sequential processing module 1012 may process actions included in the first sub plan. The first sequential processing module 1012 may process the first sub plan to generate the first result. The first sequential processing module 1012 may deliver the first result to the client module 151.

In an embodiment, the client module 151 may receive the first result. A second execution engine 1020 may start to process the second sub plan based on the first result. The client module 151 may deliver the first result and/or the second sub plan to the second execution engine 1020.

In an embodiment, the second execution engine 1020 may process actions having the user terminal 100 as an end point and may generate a goal action. A second sequential processing module 1021 included in the second execution engine 1020 may process the second sub plan to generate the second result. The second sequential processing module 1021 may combine the first result with the second result to generate the goal action. The second sequential processing module 1021 may deliver the goal action to the client module 151.

Figure 11:
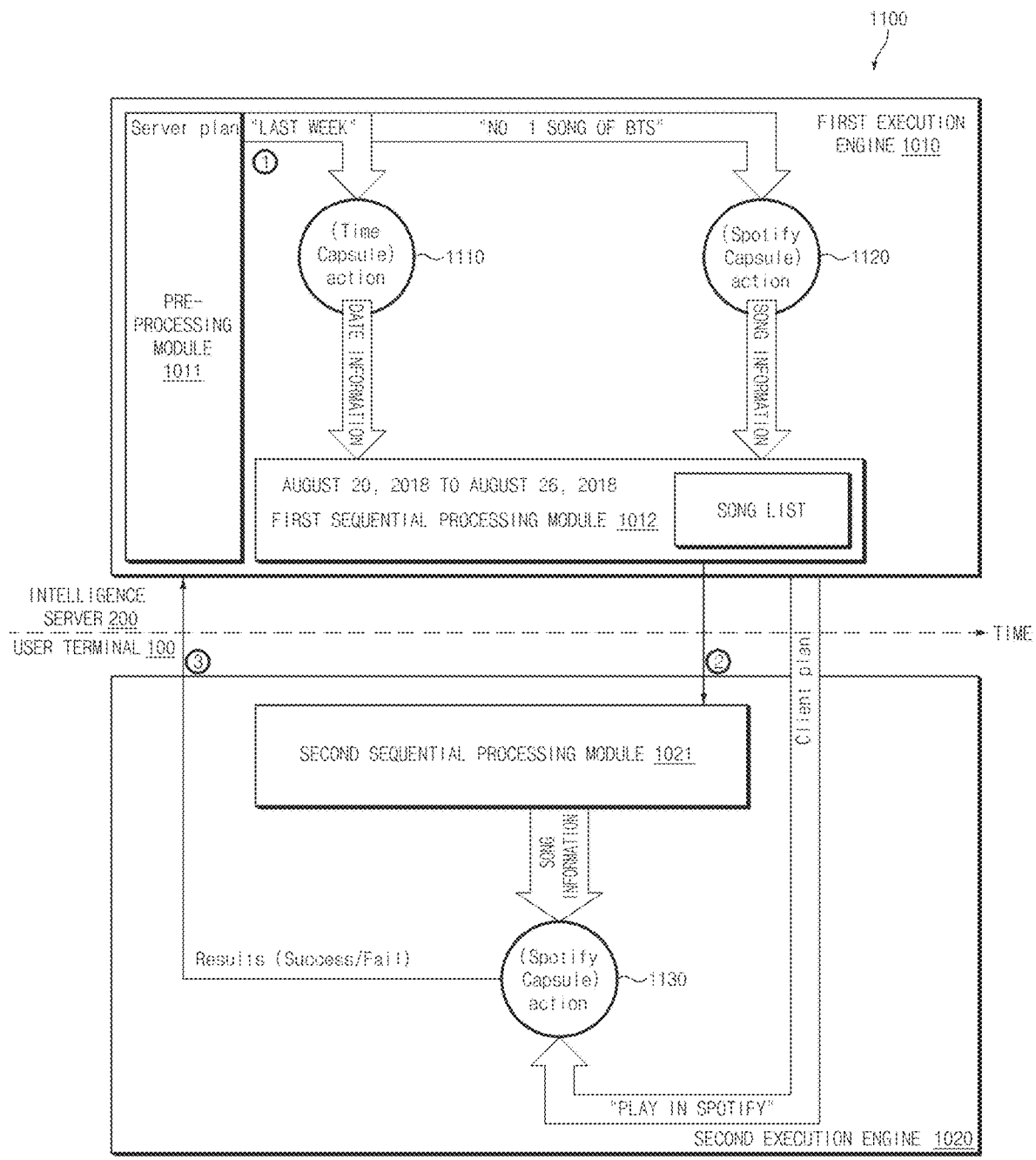
FIG. 11 is a diagram illustrating a procedure of processing an utterance in which there is dependency between actions having different end points, according to an embodiment of the disclosure.

FIG. 11 is a diagram 1100 illustrating a procedure of processing an utterance in which there is dependency between actions having different end points, according to an embodiment of the disclosure.

Referring to FIG. 11, in an embodiment, the pre-processing module 1011 may deliver actions of "last week" and "NO. 1 song of BTS" constituting a server plan having the intelligence server 200 as an end point, in a plan, to capsules 1110 and 1120 included in the first execution engine 1010. (Step 1)

In an embodiment, each of the capsules 1110 and 1120 included in the first execution engine 1010 may generate date information and song information in response to the received actions of "last week" and "NO. 1 song of BTS". A first sequential processing module 1012 may receive information from the capsules 1110 and 1120 included in the first execution engine 1010 to generate concepts of "Aug. 20, 2018 to Aug. 26, 2018" and "song list".

In an embodiment, the first sequential processing module 1012 may deliver the action saying that "play in Spotify" constituting a client plan having the user terminal 100 as an end point in a plan, to a capsule 1130 included in the second execution engine 1020. The first sequential processing module 1012 may deliver the concept generated by receiving information from the capsules 1110 and 1120 included in the first execution engine 1010, to the second sequential processing module 1021. (Step 2)

In an embodiment, the capsule 1130 included in the second execution engine 1020 may receive song information from the second sequential processing module 1021. The capsule 1130 included in the second execution engine 1020 may merge the song information and an action saying that "play in Spotify" to generate the final result for performing a goal action. The capsule 1130 included in the second execution engine 1020 may perform the goal action. The capsule 1130 included in the second execution engine 1020 may deliver the result including whether the goal action succeeds and/or fails, to the pre-processing module 1011. (Step 3)

Figure 12:
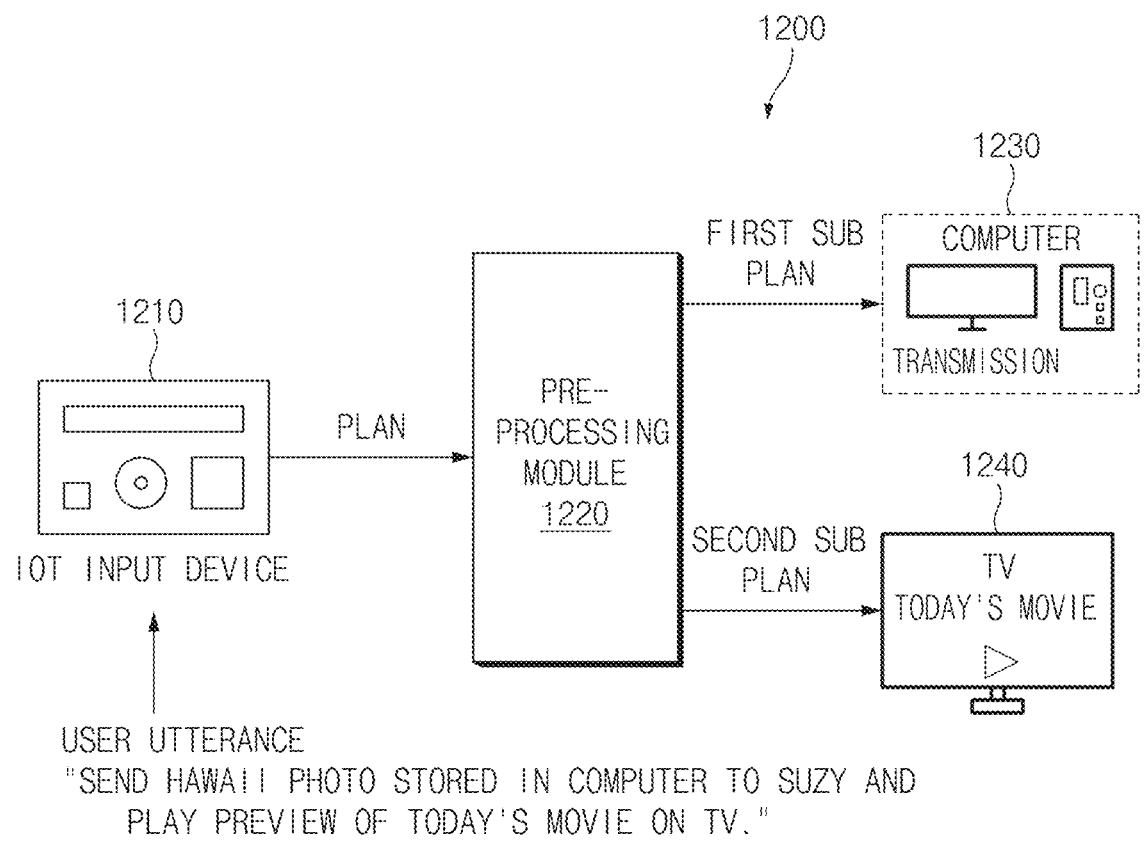
FIG. 12 is a diagram illustrating a procedure of processing an utterance in an IoT environment having different end points, according to an embodiment of the disclosure.

FIG. 12 is a diagram 1200 illustrating a procedure of processing an utterance in an Internet of Things (IoT) environment having different end points, according to an embodiment of the disclosure. The IoT environment may be an environment in which objects in a specific space, such as a house or an office, may interact with one another while being connected to one another through wireless communication. The IoT environment may include an IoT input device 1210, a pre-processing module 1220, and/or a plurality of home appliances 1230 and 1240. For example, the plurality of home appliance 1230 and 1240 may include the computer 1230 and/or the TV 1240.

Referring to FIG. 12, in an embodiment, the IoT input device 1210 may receive a user's utterance and may establish a plan such that the connected plurality of home appliances 1230 and 1240 perform the corresponding operation. The pre-processing module 1220 may divide actions included in a plan depending on an end point to generate a plurality of sub plans again. Each of the plurality of home appliances 1230 and 1240 may operate depending on a plurality of sub plans.

In an embodiment, the user may make an utterance that allows the plurality of home appliances 1230 and 1240 to operate at the same time. For example, the user may make an utterance saying that "send a Hawaii photo stored in a computer to Suzy and play the preview of today's movie on TV" to the IoT input device 1210.

In an embodiment, the IoT input device 1210 may establish the plan for the user's utterance to transmit the plan to the pre-processing module 1220. The pre-processing module 1220 may separate actions capable of being performing in the computer 1230 and actions capable of being performing on the TV 1240, in the plan. The pre-processing module 1220 may generate a first sub plan, using the actions capable of being performing in the computer 1230. The pre-processing module 1220 may generate a second sub plan, using the actions capable of being performing on the TV 1240. For example, the pre-processing module 1220 may generate the first sub plan, using the actions associated with a plan of "send a Hawaii photo stored in a computer to Suzy" and may generate a second sub plan, using the actions associated with a plan of "play the preview of today's movie on TV".

In an embodiment, the computer 1230 may process the first sub plan to perform the goal action of "sending a Hawaii photo stored in the computer to Suzy". At the same time, the TV 1240 may process the second sub plan to play the preview of today's movie. As a plurality of sub plans are respectively delivered to the plurality of home appliances 1230 and 1240, each of the plurality of home appliances 1230 and 1240 may operate at the same time without latency, in response to a user utterance including the plurality of home appliances 1230 and 1240.

Figure 13:
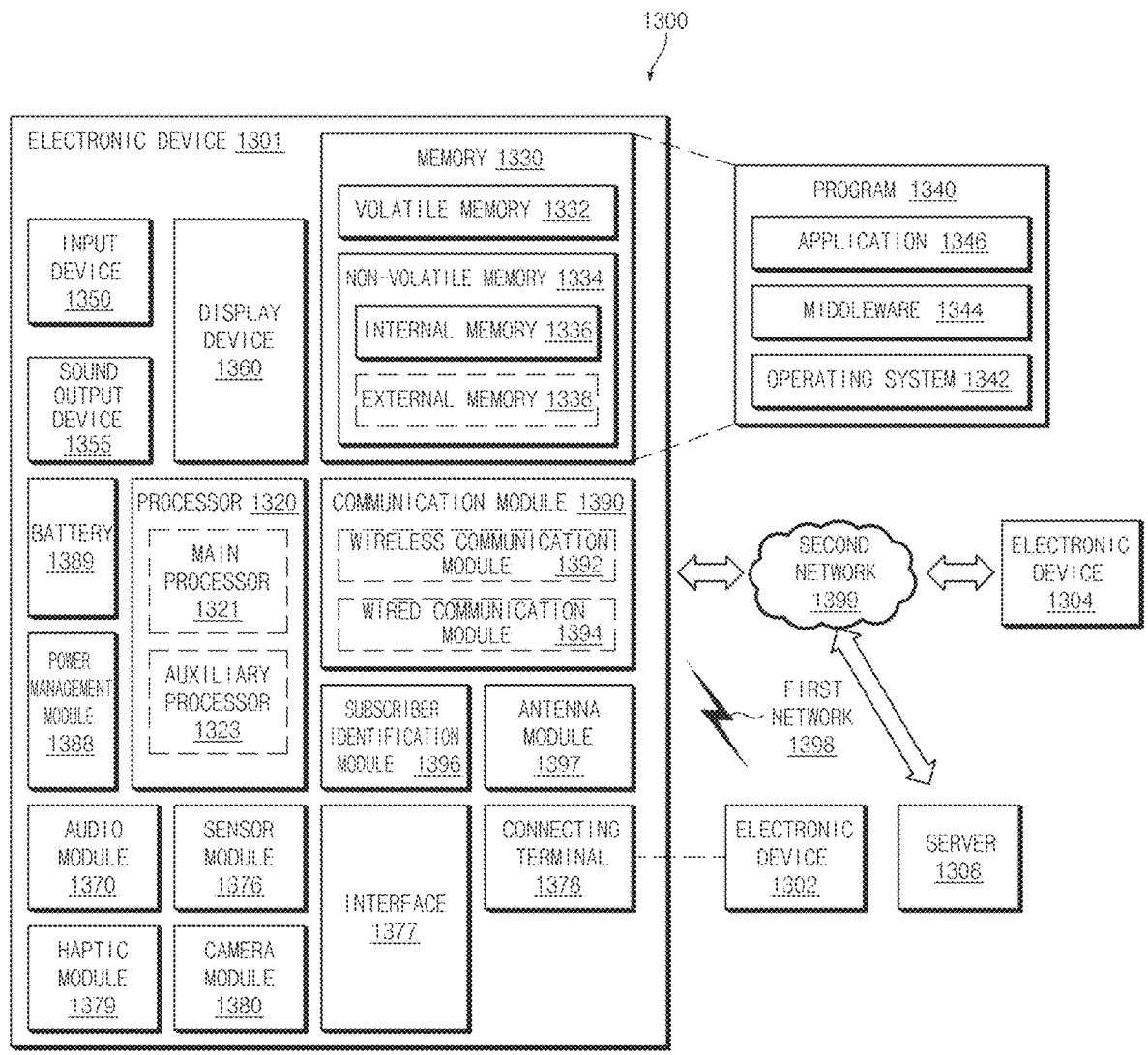
FIG. 13 is a block diagram illustrating an electronic device in a network environment according to an embodiment of the disclosure.

FIG. 13 is a block diagram illustrating an electronic device 1301 in a network environment 1300 according to an embodiment of the disclosure.

Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by another component (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™ wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the specification, different actions are capable of being simultaneously processed at each end point after actions for which the connection order is set to be executed in a plan having multiple end points are classified for each end point, thereby reducing latency occurring when actions are sequentially processed at a single end point.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for processing a plan including multiple end points, the method comprising:
    obtaining an intent corresponding to a user utterance;
    generating the plan for setting a connection order of actions for executing the intent;
    determining whether there are multiple end points of the actions;
    determining whether the actions having different end points are independent; and
    when the actions having the different end points are independent, combining actions having the same end points to generate a plurality of sub plans again and then processing the plurality of sub plans in parallel.

2. The method of claim 1, wherein a storage location of the actions is set depending on the end points having the actions.

3. The method of claim 1, further comprising:
    when the actions having the different end points are independent, collecting actions having the same end points to generate a single sub plan.

4. The method of claim 1, further comprising:
    when the actions having the different end points are not independent, processing the actions having the different end points in an order set depending on dependency.

5. The method of claim 1, further comprising:
    dividing a plurality of actions included in the plan depending on the end points; and
    when it is determined that there is no dependency between the actions having the different end points, separating the actions having different end points.

6. The method of claim 1, further comprising:
    processing the actions included in a first sub plan among the plurality of sub plans to generate a first result; and
    processing the actions included in a second sub plan among the plurality of sub plans to generate a goal action based on the first result.

7. The method of claim 6, further comprising:
    processing the actions included in the second sub plan among the plurality of sub plans to generate a second result; and
    merging the first result and the second result to generate the goal action.

8. The method of claim 1, wherein the multiple end points include a user terminal and/or an intelligence server.

9. The method of claim 1, further comprising:
    receiving the user utterance from an input device connected to a plurality of home appliances;

establishing the plan such that the plurality of home appliances perform a corresponding operation; and dividing actions included in the plan depending on the end points to generate the plurality of sub plans again.

10. An electronic device applying a method for processing plans including multiple end points, the electronic device comprising:

a client module operationally connected to an intelligence server; and an execution engine operatively connected to the client module, wherein the client module is configured to:

receive a user utterance to transmit the user utterance to the intelligence server, set a connection order of concepts and/or actions, using the plans, receive a first sub plan generated using first actions having the electronic device as an end point among the actions from the intelligence server, generate a second sub plan, using second actions having the intelligence server as the end point among the actions, and when the actions having the different end points are independent, process the first sub plan and the second sub plan in parallel.

11. The electronic device of claim 10, wherein the client module is further configured to receive a first result generated by processing the first sub plan from the intelligence server.

12. The electronic device of claim 11, wherein the client module is further configured to deliver the first sub plan and/or the first result to the execution engine, and wherein the execution engine is further configured to process the first sub plan to generate a goal action by reflecting the first result.

13. The electronic device of claim 12, wherein the execution engine includes:

a parallel processing module configured to generate a second result by processing the second sub plan; and a result merging module configured to generate the goal action by merging the first result and the second result.

14. The electronic device of claim 10, wherein the client module is further configured to receive a sub plan that adjusts an order such that actions having the same end points are first processed when the actions having the different end points are dependent.

15. A method of processing plans including multiple end points, the method comprising:

determining whether there are a plurality of end points of actions, of which a connection order is set by the plans;

when there is dependency between the actions having different end points, identifying an end point of a goal action;

performing actions belonging to an end point other than the end point of the goal action to shrink and update a plan establishing and/or setting an execution order of the actions for performing an intent;

delivering the updated plan to an end point performing the goal action; and performing actions belonging to the end point performing the goal action and performing the goal action.

16. The method of claim 15, further comprising:

first performing actions having an end point different from the end point of the goal action.

17. The method of claim 15, further comprising:

performing actions belonging to an end point other than the end point of the goal action to generate a first result; and performing actions belonging to an end point performing the goal action based on the first result.

18. The method of claim 17, further comprising:

performing actions belonging to an end point performing the goal action to generate a second result; and combining the first result with the second result to generate the goal action.

19. The method of claim 15, wherein the plan sets a processing order and/or processing method of a plurality of concepts or actions.

20. The method of claim 15, wherein the performing of the goal action includes transmitting a result including whether the goal action succeeds or fails.

* * * * *